W. O'CONNOR.
DRAFT WHEEL CONNECTION FOR WHEEL AND GANG PLOWS.
APPLICATION FILED APR. 5, 1916.

1,274,075.

Patented July 30, 1918.
2 SHEETS—SHEET 1.

Witnesses

Inventor
William O'Connor

By
Attorneys

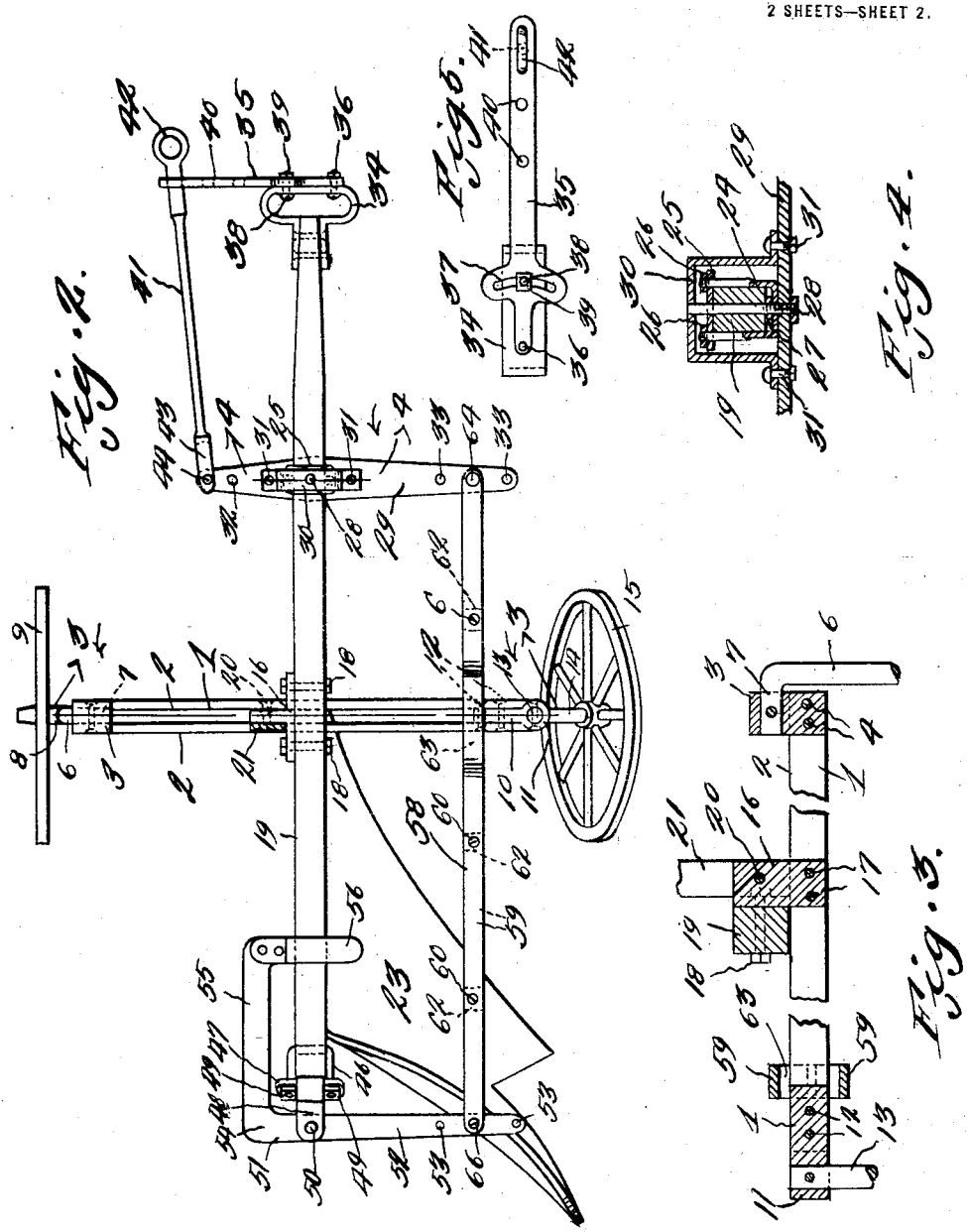

UNITED STATES PATENT OFFICE.

WILLIAM O'CONNOR, OF BOULDER, COLORADO.

DRAFT-WHEEL CONNECTION FOR WHEEL AND GANG PLOWS.

1,274,075. Specification of Letters Patent. Patented July 30, 1918.

Application filed April 5, 1916. Serial No. 89,100.

*To all whom it may concern:*

Be it known that I, WILLIAM O'CONNOR, a citizen of the United States, residing at Boulder, in the county of Boulder, State of Colorado, have invented a new and useful Draft-Wheel Connection for Wheel and Gang Plows; and I do hereby declare the following to be a full, clear, and exact description of the invention, such as will enable others skilled in the art to which is appertains to make and use the same.

This invention relates to an improved bracing draft apparatus, and an object of the invention is to provide an improved device of this kind particularly adapted for use in connection with gang plows for providing a bracing action or an effect on the beam of the plow.

A further object of the invention is to provide a bracing apparatus consisting of a plurality of levers, including an inter-connected bracing bar in parallelism with the plow beam, and the levers arranged in such a manner in connection with the beam, that when they and the inter-connecting bar are moved to become rigid, the bar will exert a bracing effect or action on the plow beam and vice versa, thereby reinforcing the plow beam, particularly when the plow is in operation.

A further object of the invention is to provide a bracing draft apparatus, whereby as the draft animals are allowed to gain a start forward before exerting a pull on the plow, thereby, relieving the sudden strain on the animal at the time the animals start forward, and when the animals reach the limit of their initial start, a bracing effect or action is imparted on the rear portion of the plow beam.

A further object of the invention is to provide a device of this kind, whereby four horses or more abreast may be worked in connection with a gang or sulky plow. In other words, an object of the invention is to provide room for four or more horses abreast, without putting them in the loose dirt and at the same time allowing the draft animals to gain a good start and exert a combined pulling and bracing action on the plow, thereby relieving the strain on the animals, at the time the animals start forward. In practical fields the details of construction may necessitate alterations, falling within the scope of what is claimed.

The invention comprises further features and combination of parts, as hereinafter set forth, shown in the drawings and claimed.

In the drawings:

Fig. 2 is a plan view of the plow illustrating the bracing draft apparatus.

Fig. 3 is a sectional view on line 3—3 of Fig. 2.

Fig. 4 is a sectional view on line 4—4 of Fig. 2.

Fig. 5 is an end view of the forward part of the plow beam, illustrating the pivotally mounted bracket arm, through which a slide rod is guided.

Figure 1:
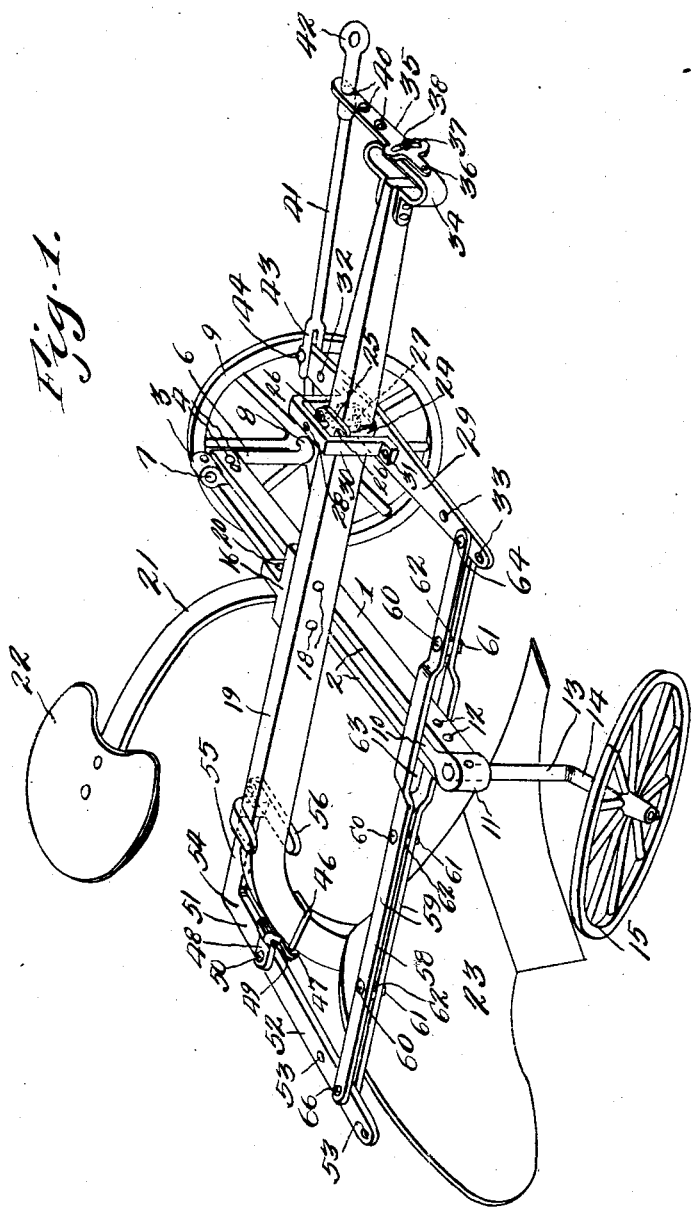
Figure 1 is a view in perspective showing a conventional form of wheel plow, illustrating the bracing draft apparatus as applied thereto.

Referring more especially to the drawings, 1 designates a transverse beam, consisting of two side parts 2, and between the side parts at one end of this beam a horizontal cylindrical bearing is secured by the rivets or bolts 4. A vertical axle 6 is provided having an upper angled end 7 journaled in said cylindrical bearing 3 and is provided at its lower end with a stub axle 8, on which the land side wheel 9 is journaled. Also between the side parts 2 at the other end of the beam 1 the flat portion 10 of the cylindrical bearing 11 is secured by the rivets or bolts 12. Journaled in the bearing 11 and secured therein by means of the pin is a vertical axle 13 having a downwardly and laterally extending portion 14 on which the furrow wheel 15 is journaled. Also between the bars 2 a T-shaped bracket plate 16 is secured by the bolts or the rivets 17, and which bracket plate in turn is bolted at 18 to the plow beam 19. By means of the bolt 20, the seat supporting leg 21 (which is provided with a seat 22) is secured to the bracket plate. The plow beam 19 is provided with the usual plow 23. A U-shaped plate 24 arches the plow beam upwardly, there being a clamping plate 25 on top of the beam, to receive the reduced upper ends of the U-shaped plate 24, which reduced ends are provided with nuts 26. A nut 27 is interposed between the U-shaped plate 24 and the plow beam. A bolt 28 extends vertically through the U-shaped plate 24, through the nut 27, and through the plow beam 19. The bolt 28 is threaded into the nut 27. Pivotally mounted upon the bolt 28 between its head at the lower end thereof and the U-shaped plate 24 is a transverse bar 29, to which the U-shaped bracket 30 is secured by means of the bolts 31. The bar 29 is pivoted upon the bolt 28, so as to provide a short arm and a long arm, both of which arms being provided with a series of apertures 32 and 33. The forward end of the plow beam 19 is provided with a loop 34, to which a bracket arm 35 is pivotally bolted as at 36. The bracket arm 35 is provided with a segmental slot 37, the curvature of which is formed on an arc of a circle whose center is located at 36, there being a bolt and nut 38 and 39, which may be used for clamping the bracket arm in adjusted positions. However, the nut 39 may, if it is so desired, remain loose, so that the bracket arm 35 is free to slightly oscillate vertically. The bracket arm 35 beyond the slot 37 is provided with several apertures 40, in any one of which a rod 41 is slidably mounted. The forward end of the rod 41 terminates in an eye 42, to which a suitable draft equalizer (not shown) of draft animals (not shown) may be connected. The rear forked terminal or end 43 of the rod 41 is pivoted by means of a bolt 44 to the short arm of the bar 29, the bolt 44 adapted to pass through any one of the apertures 32, so as to adjust the rod 41 with relation to the bar 29. A U-shaped clamp 46 arches the rear part of the plow beam 19 and has its arms (the terminals of which are threaded) passing through a plate 47, which is provided with bent-over ears 48. The threaded terminals of the arms of the clamp 46 are provided with nuts 49, to hold the plate 47 in position. Pivoted at 50 between the ears 48 is a transversely disposed lever 51, the long arm 52 of which is provided with several apertures 53. The short end 54 of the lever 51 merges into the forwardly extending arm 55, the terminal of which is provided with forks or a U-formed portion 56, which extends laterally, and is adapted to arch the plow beam 19 transversely, in the manner shown in the drawings, so as to abut against the land side of the plow beam. An elongated link 58 consisting of two bars 59 is provided. The bars 59 are bolted together by means of the bolts and nuts 60 and 61, there being intermediate nuts 62, in order to hold the bars 59 at a spaced interval from each other. The bars 59 near their forward ends are so arched or bowed upwardly and downwardly, as to provide a space 63 of sufficient size, serving to receive the transverse beam 1. By means of the link 58 and its opening or space 63 therein in conjunction with the levers 29 and 51, the plow beam 19 is braced relative to the transverse supporting beam 1, and vice versa. In fact by this construction the plow beam 19 is braced to prevent any twisting action of the beam. The space 63 is elongated, to permit the link 58 to move backwardly and forwardly, incident to the bar or lever 29 oscillating. A bolt 64 is designed to pass through any one of the apertures 33 of the long arm of the bar or lever 29, in order to pivotally connect the forward end of the link 58 to the transverse bar or lever 29. A bolt 66 is designed to pass through any one of the apertures 53, to pivotally connect the rear end of the link 58 adjustably to the long arm of the lever 51. In practice, the levers 29 and 51 are designed to have a reasonable amount of pivotal movement, and when the operator stops the draft animals, thereby bringing the plow at rest, there is slack in the traces, therefore, foot pressure is applied by the operator to the long arm of the lever 29, therefore practically taking up the slack in the traces and moving the part 56 from contact with the rear part of the plow beam. Therefore, it is to be noted that the animals when again moving forward, are permitted to gain a considerable and substantial start before applying a pull to the plow, thereby relieving the sudden strain on the animals, which ordinarily occurs at the same time the animals start forward. Owing to the slack in the traces having been taken up and the part 56 moved out of contact with the rear part of the plow beam by the operator applying pressure to the long arm of the lever 29, a pull on the rod 41, will operate the transverse bar or lever 29, the link 58, and the lever 51, so that they will move to become fixed, whereby a bracing action will be imparted to the plow beam in parallelism thereto and to the rear end thereof, particularly when the animals reach the limit of their initial start.

The invention having been set forth, what is claimed as new and useful is:

The combination with a plow beam, of a transverse supporting beam provided with supporting wheels, means for mounting the plow beam on the supporting beam, a transverse lever bar pivoted to the plow beam in advance of the supporting beam and having a short arm and a long arm, a lever pivotally mounted on the plow beam at its extreme rear end thereof and transversely of the plow beam, said last named lever having a long arm and a short right angle arm, a member connected to the extremity of the short right angle arm and having forks laterally straddling the plow beam, an elongated link having its opposite ends adjustably connected to the long arms of said levers respectively, said link having a guide opening through which the supporting beam extends, whereby the plow beam is braced relative to the support-beam and vice versa, and whereby the link is allowed to move transversely of the supporting beams, and a draft rod connected to the short arm of the first lever, whereby the levers and the link may be moved to become fixed, to exert a bracing action on the plow beam.

In testimony whereof I have signed my name to this specification in the presence of two subscribing witnesses.

WILLIAM O'CONNOR.

Witnesses:
ROSE E. WILDER,
FLORENCE W. COATES.

Copies of this patent may be obtained for five cents each, by addressing the "Commissioner of Patents, Washington, D. C."